Sept. 7, 1954 S. A. PROCTER 2,688,712
TELEVISION RECEIVER
Filed Oct. 28, 1950
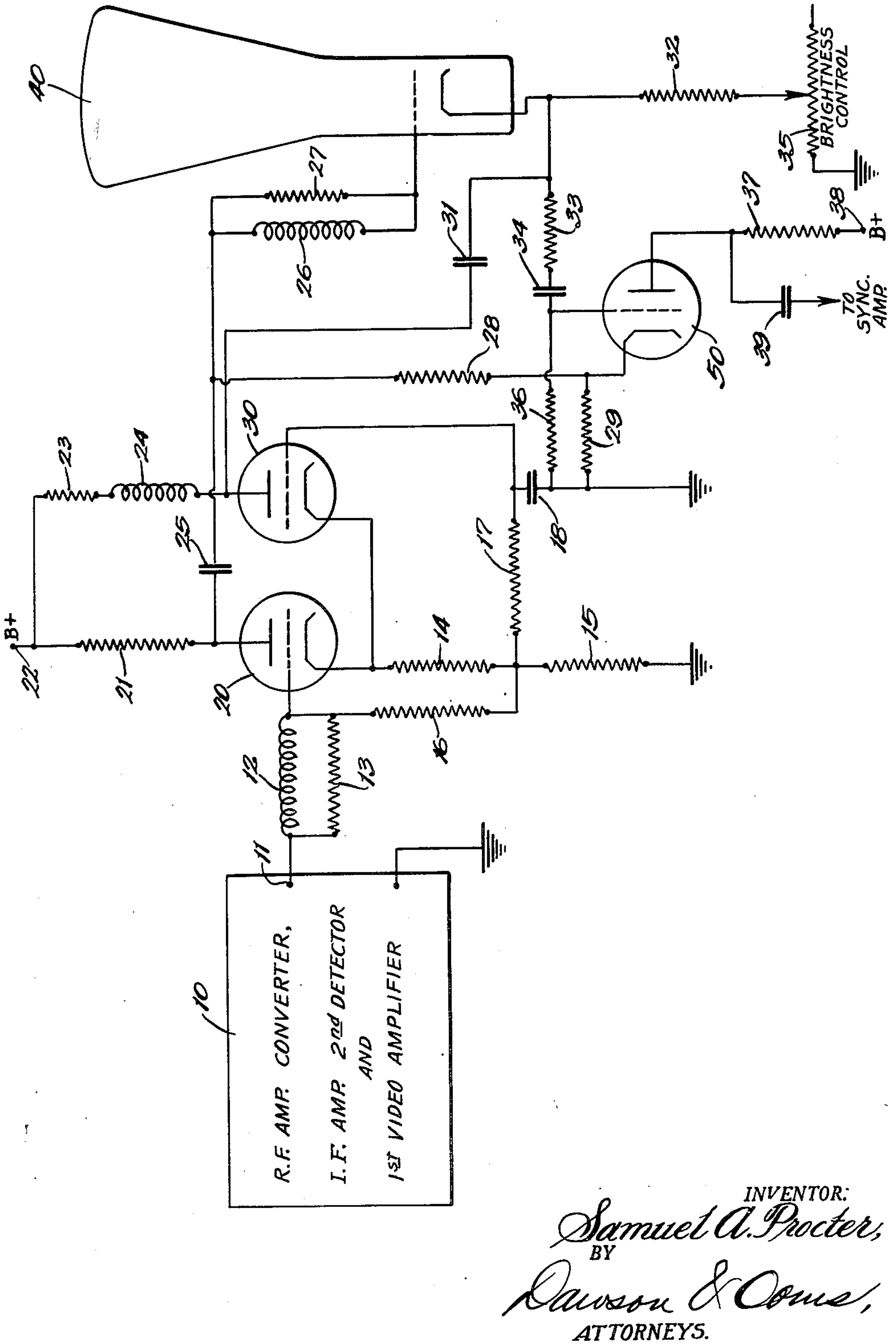
INVENTOR:
Samuel A. Procter,
BY
Dawson & Ooms,
ATTORNEYS.

Patented Sept. 7, 1954 2,688,712

UNITED STATES PATENT OFFICE 2,688,712

TELEVISION RECEIVER

Samuel A. Procter, Chicago, Ill.

Application October 28, 1950, Serial No. 192,710

7 Claims. (Cl. 315—30)

This invention relates to improvements in television receivers and, in particular, to a novel and important improvement in the art of amplifying the video signal.

In this invention I have succeeded in achieving successful video amplification with the use of triode tubes, which, in the prior art, have always been considered unsuitable for video applications because of limited pass-band characteristics. In my invention, also, I have successfully employed push-pull video amplification, applying one output phase to the control grid of the cathode-ray picture tube and the other phase to the cathode thereof.

By thus successfully using a push-pull video amplifier circuit, I have, moreover, approximately doubled the peak-to-peak signal voltage available for modulation of the cathode ray for any given value of plate supply voltage. This feature is of tremendous practical importance in the design of low-cost projection television receivers and direct-view receivers having large, bright picture tubes.

An additional feature of my invention is a simple circuit which, in co-operation with the push-pull video amplifier, functions as a D.-C. restorer and as a circuit for separating the synchronizing signals from the video signals. That circuit, which employs only one triode tube, provides an output voltage substantially double that which could be obtained, for any given driving voltage, from a conventional circuit. In other words, the sync-separator circuit thus takes full advantage of the voltage-doubling characteristics of the push-pull video amplifier.

The novel and remarkable results obtained from a television receiver embodying my invention are due in considerable degree to my use of a broadly new technique of compensation, which permits independent compensation over two frequency ranges in the same amplifier stage. This is achieved by using a push-pull video amplifier and placing compensation for one frequency range in one signal channel and compensation for a second frequency range in the other signal channel. This results in a video amplifier having vastly better and broader pass-band characteristics than have ever been heretofore achievable with triode tubes, and it may fairly be said that the achievement of that result is one of the major objects of my invention.

Another object of my invention may be said to be the use of the interelectrode capacitance between the control grid and the cathode of a television picture tube as a vital circuit element for achieving high-frequency compensation in the video amplifier. To the best of my belief, this represents a broadly new contribution to the art, and it has proved sensationally successful.

Still another object of my invention is to provide a push-pull video amplifier permitting double the normal signal voltage output from the video amplifier for a given plate supply voltage.

A still further object of my invention is to provide, for my push-pull video amplifier, a distinctive and novel separator and D.-C. restorer circuit which, while performing with perfect stability, develops substantially double the usual output voltage for synchronizing purpose, for a given level of signal strength.

Other objects and advantages of my invention will appear as the specification proceeds.

In the accompanying drawing, I have shown, in the single figure thereof, an illustrative embodiment of my invention, drawn in diagrammatic and schematic form.

Referring now to the drawing, it may be noted that I have shown as a single block 10 the portions of a television receiver which precede the final video amplifier; that is, the R.-F. amplifier, the converter, the I.-F. amplifier, the second detector, and the first video amplifier. Since my present invention does not concern itself with those components of the receiver, and since those elements are all well known to persons skilled in the art, I have considered it unnecessary in this specification to describe them in detail.

As is customary, the output of the first video amplifier may for present purposes be assumed to be a varying voltage, unbalanced with respect to ground, appearing at output terminal 11, normally the "cold" side of an output coupling condenser connected to the plate of the first video amplifier.

Output terminal 11 is connected through peaking coil 12 to the grid of triode vacuum tube 20. Peaking coil 12 may be shunted by loading resistor 13, the function of which is to broaden substantially the band of frequencies over which peaking coil 12 is operative to affect the gain of the video amplifier.

Vacuum tube 30 operates as a push-pull "running mate" of vacuum tube 20. Both these tubes are shown in the drawing as triodes, and, in a typical practical embodiment, they may be the respective halves of a twin-triode tube such as the 12AT7.

The cathodes of tubes 20 and 30 are connected together and are thence led to ground through the series combination comprising resistors 14 and 15. Resistor 15 is operative as a cathode load resistor; resistor 14, normally of substantially smaller ohmic resistance than resistor 15, functions as part of the cathode load impedance of both tubes 20 and 30, and also functions as a biasing resistor, since gridleak resistor 16 is connected between the grid of tube 20 and the junction of resistors 14 and 15.

The grid of tube 30 is placed at the same D.-C. potential as that of tube 20, by being connected through resistor 17 to the junction of resistors 14 and 15. The grid of tube 30 is held, however, at ground potential for video signals by being shunted directly to ground through by-pass capacitor 18.

The plate of tube 20 is connected through plate load resistor 21 to a source of positive direct potential denominated "B" and marked with reference numeral 22 on the drawing. The plate of tube 30 is connected to the positive high-voltage source 22 through plate load resistor 23 and mid-band peaking coil 24.

The plate of tube 20 is connected to the control grid of cathode-ray tube 40 by the series combination of coupling capacitor 25 and inductor 26. Inductor 26 is shunted by loading resistor 27. Connected to the junction of elements 25 and 26 is one terminal of a resistor 28, the other terminal of which is connected through resistor 29 to ground. The cathode of triode vacuum tube 50 is connected to the junction of resistors 28 and 29. The plate of tube 30 is connected to the cathode of picture tube 40 through coupling capacitor 31. The cathode of picture tube 40 is connected through isolating resistor 32 to the movable arm of brightness control potentiometer 35 and is also connected to ground through a series circuit comprising, in descending order of potential, resistor 33, capacitor 34, and resistor 36. The grid of tube 50 is connected to the junction of capacitor 34 and resistor 36.

The plate of tube 50 is connected through load resistor 37 to a source of positive potential denoted 38. Source 38 will normally be of somewhat smaller voltage output than source 22. (It will of course be understood that sources 22 and 38 may be identical, provided suitable means are used to maintain the voltages at appropriate values. Similarly, it will be understood that the negative terminals of all potential sources are connected to ground.)

A coupling condenser 39 is shown connecting the plate of tube 50 to the input of the synchronizing signal amplifier, denoted on the drawing as "sync. amp."

In the usual television receiver application, wherein the video pass-band requirements extend upward to somewhat above four megacycles, coil 12 will be designed to resonate with the input capacitance of tube 20 at a frequency of about 3.8 megacycles.

Coil 26 forms the principal inductive element in a very complicated reactive loop comprising as major elements the grid-cathode capacitance of picture tube 40, coupling condenser 31, the plate-cathode capacitances of tubes 30 and 20 respectively, and coupling capacitor 25. The principal capacitive reactance in that loop is found in the interelectrode capacitances of the picture tube and of tubes 30 and 20. As a result, at or near the resonant frequency of the loop, maximum signal voltages are impressed across the interelectrode capacitances and, in particular, between the grid and cathode of picture tube 40. Coil 26, therefore, is chosen to make the aforementioned reactive loop resonant near the upper end of the pass-band—preferably at about 3.8 megacycles.

Coil 24 is used for the purpose of peaking the signal channel of tube 30 in the mid-band range. Therefore, its value is chosen to maximize the amplification of tube 30 at about 2.5 megacycles.

Resistor 28 is an isolating resistor whose value, in a normal application, may be a few thousand ohms. Resistor 29 will normally have a many times higher ohmic value than resistor 28.

*Operation*

Tubes 20 and 30 operate as a push-pull amplifier. The grid of tube 20 is driven from the first video amplifier through peaking coil 12, which is chosen to resonate with the input capacitance of tube 20 at a frequency near the high edge of the desired pass-band. Both tubes 20 and 30 derive their grid bias from the drop through resistor 14; the grid of tube 30, however, is held at A.-C. ground potential by the by-pass condenser 18, which is large enough to have negligible impedance over the entire video range of frequencies. The resistor 15 is proportioned relative to the resistor 21 so as to cause a substantial fraction of the signal voltage to be developed between the cathodes of tubes 20 and 30 and ground. Thus tube 20 is driven on its control grid and tube 30 is driven via its cathode. This results in an almost perfectly balanced push-pull operation.

The variational output voltage derived from the plate of tube 20 is applied to the control grid of picture tube 40 through the coil 26. As heretofore mentioned, the reactive loop which includes coil 26 is resonant near the high end of the amplifier pass-band, and as a result there is a resonant build-up of signal voltage in the high range between the control grid and cathode of the picture tube. This produces effective amplification over the high range of video frequencies—a result heretofore unobtainable with triode tubes.

The plate of tube 30 has shunt-peaking coil 24 in series with load resistor 23, for the purpose of boosting mid-band amplification. The plate of tube 30 is coupled through condenser 31 to the cathode of the picture tube 40. While the cathode is held at the desired D.-C. potential by potentiometer 35, it is isolated therefrom by resistor 32, so as to permit its potential to be changed rapidly in accordance with the changes in plate potential of tube 30.

Since the beam brilliancy is determined by the difference in potential between the grid and cathode, and since the increase in mid-band amplification accomplished by the compensating circuits associated with tube 30 is effective to supplement the boost in high-range amplification accomplished by the resonant loop embodying coil 26, the amplifier as a whole yields substantially flat response over the entire video range up to 4.5 megacycles per second. At the same time, it gives excellent voltage amplification. In a specific embodiment which I have constructed and tested, I obtained a voltage amplification of 75 from a two-stage video amplifier comprising a triode first video stage followed by the push-pull second video stage shown in the drawing. That amplifier was flat in its frequency characteristics over the entire video range up to 4.5 megacycles, and it yielded a substantially undistorted peak-to-peak signal output of more than sixty volts.

The D.-C. restorer and synchronizing-signal separator circuit embodying tube 50 is of novel design and particularly adapted to make use of the benefits of push-pull video amplification. The cathode of tube 50 is supplied with a negatively going video signal from the plate of tube 20, through isolating resistor 28. The magnitude of resistor 29 is much greater than that of resistor 28, with the result that most of the developed video signal from the plate of tube 20 is applied to the cathode of tube 50.

A positively going video signal from the plate of tube 30 is applied to the grid of tube 50 through isolating resistor 33 and coupling condenser 34. The plate load resistor 37, in the plate circuit of tube 50, has relatively low ohmic value as compared to resistor 29. As a result the voltage drop across tube 50 is relatively large. Under no-signal conditions the drop across resistor 29 will be just enough to approximate plate current cutoff. The application of a negative-going signal to the cathode, under these conditions, will change the charge in coupling condenser 25 by an amount approximating the peak-to-peak value of the modulating signal, this difference in charge appearing an increase in voltage drop across resistor 29. The application of a similar positive-going signal to the grid of tube 50 will cause additional plate current to flow during the sync interval and a corresponding increase in the drop across resistor 29, thereby further increasing the differential charge in coupling condenser 25. This double action creates a D.-C. potential across resistor 29 that is approximately twice the peak-to-peak value of the applied signal, providing full D.-C. restoration to the picture tube. This simultaneous application of signal voltage to both the cathode and the grid of tube 50 results in substantially doubling the instantaneous plate current of tube 50 and thus greatly increases the rapidity with which condenser 25 is charged to a steady-state condition.

After a few cycles, condenser 25 assumes a steady-state charge approximately equal to the plate-to-plate video voltage between tubes 20 and 30. This charge is held, so long as the signal amplitude is constant, because the discharge path of condenser 25— through resistor 29—has a very long time constant. Any charge which has leaked off during a given cycle, however, is rapidly replenished by the surge of current which flows through resistor 37 and tube 50 (a relatively low-resistance path) during the transmission of the synchronizing pulse at the beginning of the new cycle.

Since the surges of current through tube 50 are coincidental in time with the synchronizing pulses, the negatively going voltage at the plate of tube 50 may be fed to the synchronizing-signal amplifier through coupling condenser 39. At the same time, tube 50 functions as an extraordinary fast-acting D.-C. restorer circuit which at all times keeps the charge on condenser 25 at the value of the peak-to-peak video signal.

While I have in this specification described in considerable detail a particular embodiment of my invention, it is to be understood that the illustrated structure is illustrative only, and that many changes in matters of detail can be made therein by persons skilled in the art without departing from the spirit of my invention. It is accordingly my desire that the scope of my invention be determined primarily with reference to the appended claims.

I claim:

1. In a television receiver, a push-pull video amplifier providing two oppositely phased signal channels, frequency compensation means in one of said signal channels, substantially independent frequency compensation means in the other of said signal channels, a cathode-ray picture tube having a cathode and a control electrode, and circuit means connecting one of said compensated signal channels to the control electrode and the other of said compensated signal channels to the cathode, the range of frequencies affected by one of said compensating means being substantially different from the range of frequencies affected by the other of said compensating means.

2. Apparatus according to claim 1 wherein one of said compensating means affects a frequency range embracing the highest portion of the desired amplifier pass-band and the other affects a frequency range in the middle portion of said desired amplifier pass-band.

3. Apparatus according to claim 1 wherein one of said compensating means affects a frequency range between 3.8 and 4.5 megacycles and the other of said compensating means affects a frequency range lower than 3.8 megacycles and including 2.5 megacycles.

4. In a television receiver, a push-pull video amplifier providing two oppositely phased signal channels, a cathode-ray picture tube having a cathode and a control electrode, and circuit means comprising a reactive element connecting one signal channel to the control electrode and the other signal channel to the cathode, forming thereby a series loop reactive circuit having as an element the interelectrode capacitance between said control electrode and said cathode, said loop circuit being resonant at a frequency near the high-frequency limit of the desired pass-band of said video amplifier.

5. Apparatus according to claim 4 wherein said push-pull video amplifier comprises a pair of electron discharge devices each of which is provided with a cathode and an anode, and wherein said loop circuit comprises said reactive element, said interelectrode capacitance between the control electrode and the cathode of said cathode-ray tube, and the interelectrode capacitances between the respective cathodes and anodes of said electron discharge device.

6. In a television receiver, a video amplifier providing an output signal and having a finite output impedance, a cathode-ray picture tube having a cathode and a control electrode, and circuit means comprising a reactive element connecting the amplifier across the control electrode and the cathode and forming thereby a series loop reactive circuit comprising the output impedance of the amplifier, the reactive element, and the interelectrode capacitance between the control element and the cathode, the magnitude and sign of the reactance of said reactive element being chosen to make the loop circuit resonant at a frequency near the upper limit of the desired amplifier pass-band.

7. In a television receiver, a video amplifier providing an output signal and having a finite output impedance, a cathode-ray picture tube having a cathode and a control electrode, and circuit means comprising a reactive element connecting the amplifier across the control electrode and the cathode and forming thereby a series loop reactive circuit comprising the output impedance of the amplifier, the reactive element, and the interelectrode capacitance between the control element and the cathode, the magnitude and sign of the reactance of said reactive element being chosen to make the loop circuit resonant at a frequency between 3.0 and 4.5 megacycles.

References Cited in the file of this patent

UNITED STATES PATENTS

| Number | Name | Date |
|---|---|---|
| 2,116,671 | Dowsett et al. | May 10, 1938 |
| 2,226,994 | Schlesinger | Dec. 31, 1940 |

| Number | Name | Date |
|---|---|---|
| 2,255,484 | Dome | Sept. 9, 1941 |
| 2,481,045 | Schroeder | Sept. 6, 1949 |
| 2,522,967 | Shaw | Sept. 19, 1950 |
| 2,533,081 | Anderson et al. | Dec. 5, 1950 |
| 2,564,554 | Anderson | Aug. 14, 1951 |

OTHER REFERENCES

Mandel, Proceedings, I. R. E., vol. 37, #12, December 1949, page 1463.